US009556887B2

(12) United States Patent
Carpenter (10) Patent No.: US 9,556,887 B2
(45) Date of Patent: Jan. 31, 2017

(54) SYSTEM AND METHOD FOR ESTIMATING HEALTH AND REMAINING USEFUL LIFE OF A HYDRAULIC ELEMENT

(71) Applicant: Caterpillar Inc., Peoria, IL (US)

(72) Inventor: Richard Andrew Carpenter, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 14/534,611

(22) Filed: Nov. 6, 2014

(65) Prior Publication Data

US 2016/0131164 A1  May 12, 2016

(51) Int. Cl.
*F15B 19/00* (2006.01)
*B60T 17/22* (2006.01)
*B60T 13/66* (2006.01)

(52) U.S. Cl.
CPC ........... *F15B 19/005* (2013.01); *B60T 13/662* (2013.01); *B60T 17/22* (2013.01); *F15B 2201/51* (2013.01); *F15B 2211/212* (2013.01); *F15B 2211/6306* (2013.01); *F15B 2211/857* (2013.01)

(58) Field of Classification Search
None
See application file for complete search history.

(56) References Cited

U.S. PATENT DOCUMENTS

| | | | |
|---|---|---|---|
| 7,082,758 B2 | 8/2006 | Kageyama et al. | |
| 7,204,138 B2 | 4/2007 | Du | |
| 7,434,589 B2 | 10/2008 | Kim et al. | |
| 7,913,496 B2 | 3/2011 | Batenburg et al. | |
| 8,437,922 B2 | 5/2013 | Douglas | |
| 2003/0146845 A1* | 8/2003 | Imanishi | F04B 51/00 340/679 |
| 2013/0253854 A1* | 9/2013 | Chen | F15B 1/033 702/50 |
| 2014/0060030 A1* | 3/2014 | Ma | E02F 9/123 60/413 |

FOREIGN PATENT DOCUMENTS

JP        2007-77832 A      3/2007

* cited by examiner

*Primary Examiner* — Sean Shechtman
*Assistant Examiner* — Steven Garland (57) ABSTRACT

A method for estimating health and remaining useful life of a hydraulic element of a machine is provided. The method includes determining a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator. The method includes determining a discharging flow rate of the hydraulic element based upon the determined charge time of the hydraulic accumulator, a health indicator of the hydraulic element based upon a difference between the discharging flow rate and a stored discharging flow rate. The method includes determining a remaining useful life of the hydraulic element based upon the health indicator of the hydraulic element.

20 Claims, 5 Drawing Sheets

SYSTEM AND METHOD FOR ESTIMATING HEALTH AND REMAINING USEFUL LIFE OF A HYDRAULIC ELEMENT

TECHNICAL FIELD

This patent disclosure relates generally to hydraulic elements, and more particularly, to a system and a method for estimating health and remaining useful life of a hydraulic element.

BACKGROUND

The flow rate of a hydraulic element (e.g., a pump) is a good indicator of a health of the hydraulic element. Conventionally, the flow rate of a hydraulic element has been measured using expensive sensors or flow measurement devices (e.g., flow meters). One such conventional apparatus for predicting malfunctioning of a pump is discussed in U.S. Pat. No. 7,434,589, which relies on time per stroke of the pump measured by left and right sensors at the pump. However, these purely sensor based techniques and flow meters may be prone to errors over time (e.g., from sensor drift) and may need frequent replacement and/or calibration of the sensors.

Accordingly, there is a need to resolve these problems and other problems related to the conventional hydraulic element health and remaining useful life prediction techniques.

SUMMARY

In one aspect, a method for estimating health and remaining useful life of a hydraulic element of a machine is provided. The method includes determining, at a processor of the machine, a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator. The method includes determining, at the processor, a discharging flow rate of the hydraulic element based upon the determined charge time of the hydraulic accumulator. The method includes determining, at the processor, a health indicator of the hydraulic element based upon a difference between the determined discharging flow rate of the hydraulic element and a stored discharging flow rate of the hydraulic element when new. The method includes determining, at the processor, a remaining useful life of the hydraulic element based upon the health indicator of the hydraulic element. The method includes controlling, at the processor, the hydraulic element based upon the remaining useful life of the hydraulic element.

In another aspect, a system for estimating health and remaining useful life of a hydraulic element is provided. The system includes an electronic control module coupled to an output device, the electronic control module including a processor, the processor coupled to the hydraulic element. The processor is configured to determine a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator. The processor is configured to determine a discharging flow rate of the hydraulic element based upon the determined charge time of the hydraulic accumulator. The processor is configured to determine a health indicator of the hydraulic element based upon a difference between the determined discharging flow rate of the hydraulic element and a stored discharging flow rate of the hydraulic element when new. The processor is configured to determine a remaining useful life of the hydraulic element based upon the health indicator of the hydraulic element. The processor is configured to control the hydraulic element based upon the remaining useful life of the hydraulic element.

In yet another aspect, a non-transitory computer readable medium storing computer executable instructions thereupon for estimating health and remaining useful life of a hydraulic element is provided. The computer executable instructions when executed by a processor of an electronic control module of a machine cause the processor to determine a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator, determine a discharging flow rate of the hydraulic element based upon the determined charge time of the hydraulic accumulator, determine a health indicator of the hydraulic element based upon a difference between the determined discharging flow rate of the hydraulic element and a stored discharging flow rate of the hydraulic element when new, determine a remaining useful life of the hydraulic element based upon the health indicator of the hydraulic element, and control the hydraulic element based upon the remaining useful life of the hydraulic element.

DETAILED DESCRIPTION

Figure 1:
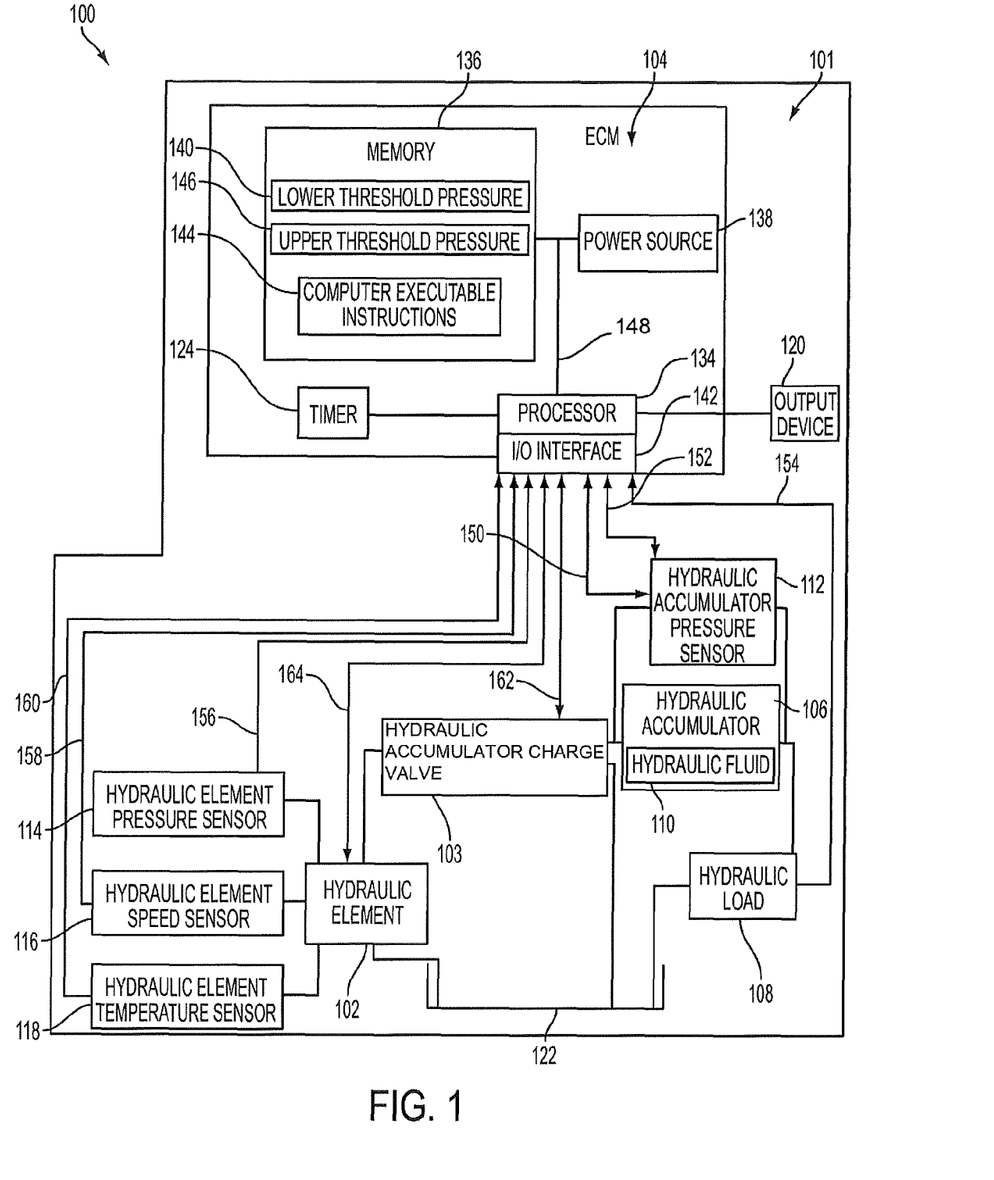
FIG. 1 illustrates a machine including a system for estimating health and remaining useful life of a hydraulic element, in accordance with an aspect of this disclosure.

Now referring to the drawings, wherein like reference numbers refer to like elements, there is illustrated in FIG. 1, a machine 100, using a schematic block diagram. The machine 100 may be a mobile or a stationary machine that performs operations associated with industries such as mining, construction, farming, transportation, landscaping, or the like. For example, the machine 100 may be a track-type tractor or dozer, a motor grader, a drilling station, a car, a truck, a bus, or other types of stationary or mobile machines known in the art. In one aspect, the machine 100 may be operating on a worksite and is in communication with a base station and a global navigation satellite system (GNSS) for operation. While the following detailed description describes an exemplary aspect in connection with the machine 100, it should be appreciated that the description applies equally to the use of the present disclosure in various types of machines.

In one aspect of this disclosure, the machine 100 may include a system 101 having a hydraulic element 102, a hydraulic accumulator charge valve 103, an electronic control module (ECM) 104, a hydraulic accumulator 106, a hydraulic load 108, a hydraulic fluid 110, a drain 122, a hydraulic element pressure sensor 114, a hydraulic element speed sensor 116, a hydraulic element temperature sensor 118, a hydraulic accumulator pressure sensor 112, and an output device 120. Although not explicitly illustrated, the machine 100 and/or the system 101 may include other components of a fuel system, a hydraulic system, and/or an oil or fluid circulation system. For example, the machine 100 may include a plurality of fuel injectors, a fuel tank, a common rail, motors, oil and fluid filters, a mechanical load driven by the engine, lubrication fluid circulation system(s), and additional sensors. It will be appreciated that the machine 100 may include other components, including but not limited to, vehicular parts including tires, wheels, engagement mechanisms, transmission, steering system, on-board communication systems, catalytic converters, axles, crankshafts, camshafts, gear systems, clutch systems, batteries, throttles, actuators, suspension systems, cooling systems, exhaust systems, chassis, ground engaging tools, imaging systems, power trains, and the like (not shown). In one aspect of this disclosure, the system 101 may be configured to or used for estimating health and remaining useful life of the hydraulic element 102, as discussed herein.

The hydraulic element 102 may be a charge pump providing fluid to the hydraulic load 108, although the hydraulic element 102 may refer to other types of components in the machine 100 configured to store, process, transmit, and/or receive various types of hydraulic fluids in the machine 100. By way of example only, the hydraulic fluid 110 may be brake fluid provided to the hydraulic load 108, when the hydraulic load 108 is a brake or a system of brakes in the machine 100, although it will be appreciated that the hydraulic element 102 could take the form of any type of a flow control device including but not limited to a proportional flow control valve, a priority valve, a flow divider, a pressure compensating flow controller, and the like, or combinations thereof. The hydraulic element 102 may be coupled to the hydraulic element pressure sensor 114, the hydraulic element speed sensor 116, and the hydraulic element temperature sensor 118, thereby providing a pressure signal 156, a speed signal 158, and a temperature signal 160, respectively, to the ECM 104. The pressure signal 156, the speed signal 158, and the temperature signal 160 provide measurements corresponding to a fluid pressure (e.g., a discharge pressure 304 in FIG. 3), an operating speed (e.g., a rotational speed), and a temperature (e.g., a fluid temperature or a structural temperature), respectively, of the hydraulic element 102 to the ECM 104. By way of example only, the hydraulic element pressure sensor 114 is an absolute pressure sensor or a gauge pressure sensor configured to obtain one or both of absolute as well as differential pressures, the hydraulic element speed sensor 116 is a tachometer, and the hydraulic element temperature sensor 118 is a thermometric device.

In one aspect of this disclosure, the hydraulic element 102 is coupled (e.g., fluidly or otherwise) to the hydraulic accumulator 106 via the hydraulic accumulator charge valve 103. In one aspect, the hydraulic element 102 may be coupled to a processor 134 of the ECM 104 via the I/O interface 142. For example, the hydraulic element 102 may receive a plurality of control signals 164 from the processor 134. The plurality of control signals 164 include electrical, wireless and/or optical signals configured to control the hydraulic element 102 based upon various conditions and parameters of the system 101 and/or the hydraulic element 102. Such control of the hydraulic element 102 may include shutting off the hydraulic element 102, switching to a different hydraulic element (not shown), reducing a flow of the hydraulic fluid 110 through the hydraulic element 102, bypassing fluid from the hydraulic element 102, and/or preventing the flow of the hydraulic fluid 110. In one aspect, the hydraulic element 102 may be coupled to a fluid storage tank or other fluid storage unit to receive the hydraulic fluid 110 and provide the hydraulic fluid 110 to the hydraulic accumulator 106 at all times or as and when appropriate.

The hydraulic accumulator charge valve 103 is configured to selectively allow or block a flow of the hydraulic fluid 110 from the hydraulic element 102 to the hydraulic accumulator 106. For example, an opening of the hydraulic accumulator charge valve 103 may effect fluid communication between the hydraulic element 102 and the hydraulic accumulator 106 to allow a flow of hydraulic fluid 110 there between. Such charging of the hydraulic accumulator 106 may occur, for example, every 10-15 seconds, although the charging may occur sooner or later than 10-15 seconds depending upon various factors such as usage of the hydraulic load 108. Likewise, a closing of the hydraulic accumulator charge valve 103 may prevent additional amounts of the hydraulic fluid 110 from flowing to the hydraulic accumulator 106. The hydraulic accumulator charge valve 103 is operatively coupled to the ECM 104. In one aspect, the hydraulic accumulator charge valve 103 may receive a control signal 162 from the ECM 104 for opening and closing the hydraulic accumulator charge valve 103 at various time instants. The control signal 162 controls the hydraulic accumulator charge valve 103 to connect or disconnect the hydraulic element 102 to the hydraulic accumulator 106, and ultimately to the hydraulic load 108. The hydraulic accumulator charge valve 103 may include actuators, buffers, and valves to manage the flow of fluid from the hydraulic element 102 to the hydraulic accumulator 106. In an alternative aspect, the hydraulic accumulator charge valve 103 may be optional and the hydraulic element 102 may be in direct fluid communication to the hydraulic accumulator 106. In yet another aspect, the hydraulic accumulator charge valve 103 may be coupled to the drain 122 to drain off excessive amounts of the hydraulic fluid 110.

The hydraulic accumulator 106 is coupled to an output of the hydraulic accumulator charge valve 103 and is configured to store the hydraulic fluid 110 under pressure. The hydraulic accumulator 106 may store fluid energy in the form of fluid pressure by using the hydraulic fluid 110 to perform work on a resilient member bearing on the hydraulic fluid 110. For example, the resilient member may be a compressible fluid, a resilient bladder, a spring, combinations thereof, or other types of resilient structures. The pressure at which the hydraulic fluid 110 is stored in the hydraulic accumulator 106 is measured by the hydraulic accumulator pressure sensor 112. In one aspect, the pressure at which the hydraulic fluid 110 is present inside the hydraulic accumulator 106 may vary and is dependent upon the hydraulic load 108.

For example, when the machine 100 is performing work on the hydraulic load 108, the hydraulic fluid 110 is supplied to the hydraulic load 108 from the hydraulic accumulator 106, and therefore, the pressure of the hydraulic fluid 110 inside the hydraulic accumulator 106 may decrease if the flow of hydraulic fluid 110 out of the hydraulic accumulator 106 is greater than a makeup flow into the hydraulic accumulator 106 from the hydraulic element 102. When the machine 100 stops performing work on the hydraulic load 108, the hydraulic fluid 110 starts building up inside the hydraulic accumulator 106 and the pressure inside the hydraulic accumulator 106 rises, the hydraulic element 102 may recharge the hydraulic accumulator 106 with a flow of hydraulic fluid 110, thereby increasing the fluid pressure within the hydraulic accumulator 106

The hydraulic accumulator pressure sensor 112 may provide a measurement of the pressure as a charging signal 150 (electrical, optical, and/or wireless) and a discharging signal 152 (electrical, optical, and/or wireless) to the ECM 104 based on whether the hydraulic accumulator 106 is charging or discharging, respectively, with the hydraulic fluid 110. In one aspect, the hydraulic accumulator pressure sensor 112 may be calibrated by the processor 134 prior to usage using test data. Such calibration may be repeated as and when needed, or at regular intervals. The hydraulic accumulator 106 may be coupled to the ECM 104, and to the processor 134, via the hydraulic accumulator pressure sensor 112. Alternatively or additionally, a direct connection between the hydraulic accumulator 106 and the ECM 104 may exist.

By way of example only, the hydraulic fluid 110 may be a brake fluid, a lubrication fluid, or other types of fluids or oils used for various purposes by the machine 100 during operation. The hydraulic fluid 110 may be stored (e.g., in the hydraulic element 102 or a storage unit) and may be present in other components of the machine 100. For example, the hydraulic fluid 110 may be in circulation in the system 101 and/or other hydraulic or oil circulation systems of the machine 100, and FIG. 1 shows the hydraulic fluid 110 inside the hydraulic accumulator 106 by way of example only and not by way of limitation. During the operation of the machine 100, the hydraulic fluid 110 may be provided from the hydraulic element 102 to the hydraulic accumulator 106, via the hydraulic accumulator charge valve 103 or directly, for use by the hydraulic load 108.

The hydraulic load 108 is coupled to an output of the hydraulic accumulator 106. The hydraulic load 108 is configured to receive the hydraulic fluid 110 at a preset pressure and temperature and use the hydraulic fluid 110 to perform a mechanical or an electro-mechanical operation. By way of example only, the hydraulic load 108 may be a brake or a system of brakes, although the hydraulic load 108 may be any component of the machine 100 that uses the hydraulic fluid 110. Although not shown, the hydraulic load 108 includes additional valves, actuators, and sensors for operation. In one aspect, the hydraulic load 108 is coupled to the ECM 104. The hydraulic load 108 is configured to send a load usage signal 154 to the ECM 104 indicating whether the hydraulic load 108 is in use. Alternatively or additionally, the hydraulic load 108 may receive one or more signals (electrical, wireless, and/or optical) from the processor 134. Such signals may aid proper operation of the hydraulic load 108. In another aspect, the hydraulic load 108 may be directly coupled to the hydraulic element 102 to receive the hydraulic fluid 110 stored in a tank or other storage inside machine 100.

The drain 122 is coupled to the hydraulic element 102, the hydraulic accumulator charge valve 103, the hydraulic accumulator 106, and the hydraulic load 108. The drain 122 is configured to receive extra and/or processed amounts of the hydraulic fluid 110 from one or more of the hydraulic element 102, the hydraulic accumulator charge valve 103, the hydraulic accumulator 106, and the hydraulic load 108. In one aspect, the drain 122 may be a plurality of drains each individually connected to the hydraulic element 102, the hydraulic accumulator charge valve 103, the hydraulic accumulator 106, and the hydraulic load 108 to respectively receive unused or extra amounts of the hydraulic fluid 110. For example, during a normal course of the operation of the machine 100, the system 101 may undergo normal wear and tear resulting in a leakage of the hydraulic fluid 110 into the drain 122. Such leakage may affect and/or degrade a system efficiency of the system 101.

The ECM 104 is a programmable electronic device coupled to the hydraulic accumulator charge valve 103, the hydraulic accumulator pressure sensor 112, the hydraulic load 108, the hydraulic element pressure sensor 114, the hydraulic element speed sensor 116, the hydraulic element temperature sensor 118, in addition to other components of the machine 100 and/or the system 101. For example, the ECM 104 may be coupled directly or indirectly to the hydraulic element 102, the output device 120, the hydraulic accumulator 106, and/or the drain 122. Further, the ECM 104 may be coupled to an engine of the machine 100, injectors, other sensor modules, and actuator systems of the machine 100. In one aspect, the ECM 104 is coupled to and is configured to probe and receive a response from the hydraulic accumulator charge valve 103, the hydraulic accumulator pressure sensor 112, the hydraulic load 108, the hydraulic element pressure sensor 114, the hydraulic element speed sensor 116, the hydraulic element temperature sensor 118 to determine a health and a remaining useful life (RUL) of the hydraulic element 102. In another aspect, the ECM 104 may have a protective cover to provide protection from temperature variations and external electromagnetic fields. In various implementations of the disclosure, only one ECM 104 may be provided in the machine 100 to implement the various features and functionalities of the disclosure. Alternatively, more than one ECM similar to the ECM 104 could be provided inside or on the machine 100.

The ECM 104 may include the processor 134 coupled to or including an input/output (I/O) interface 142, a memory 136, a power source 138, a timer 124, and a bus 148 coupling the various components of the ECM 104. It will be appreciated that although not explicitly shown, the ECM 104 may include other components such as injector drivers, heat sinks, a governor such as a proportional integral derivative (PID) controller for regulating parameters of the machine 100, signal converters and voltage converters, analog to digital converters (ADCs) and digital to analog converters (DACs), amplifiers, electronic filters, backup processors and/or co-processors, and circuitry including power supply circuitry, signal conditioning circuitry, solenoid driver circuitry, analog circuits, communication chips (e.g., CAN chips, GPS/GNSS chips, etc.), phase locked loops (PLLs), graphics controllers, and/or programmable logic arrays or other application specific integrated circuits (ASICs). These components of the ECM 104 may be included on a single layer or a multi-layer printed circuit board (PCB).

In one aspect, the processor 134 of the ECM 104 may be an n-bit microprocessor, where 'n' is an integer (e.g., n=16, 32, etc.) operating at a particular clock frequency (e.g., 40 MHz). The processor 134 is coupled to the memory 136, the power source 138, the timer 124, and the I/O interface 142. Generally, based upon data received at the I/O interface 142 from the hydraulic accumulator charge valve 103, the hydraulic accumulator pressure sensor 112, the hydraulic load 108, the hydraulic element pressure sensor 114, the hydraulic element speed sensor 116, the hydraulic element temperature sensor 118, the hydraulic element 102, and/or the hydraulic accumulator 106, in addition to other components of the machine 100 and/or the system 101, the processor 134 is configured to determine the health and the remaining useful life of the hydraulic element 102. Further, based upon such data, the processor 134 is configured to determine the system efficiency or an overall system efficiency of the system 101.

Data obtained at the processor 134 via the I/O interface 142 from the hydraulic accumulator charge valve 103, the hydraulic accumulator pressure sensor 112, the hydraulic load 108, the hydraulic element pressure sensor 114, the hydraulic element speed sensor 116, the hydraulic element temperature sensor 118, and/or other sensor modules and actuator systems of the machine 100 and/or the system 101 may correspond to one or more sensor outputs such as pressure drop across the hydraulic accumulator 106, the discharge pressure 302 of the hydraulic element 102, a discharge temperature of the hydraulic element 102, and/or a discharge speed of the hydraulic element 102. By way of example only, such data may be received at the processor 134 electrically, wirelessly, and/or optically using a pressure signal 156, a speed signal 158, a temperature signal 160, the charging signal 150, the discharging signal 152, etc. Further, such data may include information regarding oil temperature and pressure for various oil circulation systems of the machine 100, operating conditions of the engine including engine speed, engine temperature, pressure of the actuation fluid, cylinder piston position, etc. In one aspect, the processor 134 may execute computer executable instructions 144 residing or stored on a non-transitory computer readable medium (e.g., the memory 136) to estimate the health and the remaining useful life of the hydraulic element 102. The instructions when executed by the processor 134 of the ECM 104 of the machine 100 cause the processor 134 to carry out various features and functionalities of the aspects of this disclosure discussed herein. For example, the processor 134 is further configured to control the hydraulic element 102 and/or the output device 120. In one aspect, the processor 134 is a non-generic hardware processor configured to improve the functioning of a system 101 by solving the complex problem of accurately determining the health and remaining useful life of the hydraulic element 102, and/or predicting when the hydraulic element 102 in the machine 100 needs to be changed or replaced.

The memory 136 is connected to the processor 134 and stores computer readable and computer executable instruction sets, for example, the computer executable instructions 144. In one aspect, the memory 136 stores a plurality of threshold values for various components of the system 101 including an upper threshold pressure 146 and a lower threshold pressure 140 associated with the hydraulic accumulator 106. The upper threshold pressure 146 and a lower threshold pressure 140 may be specific to a type of the hydraulic accumulator 106 being used in the machine 100. Additionally or optionally, it will be appreciated that similar threshold values for the hydraulic element 102 and/or the hydraulic accumulator 106 may be stored in the memory 136. For example, such threshold values may depend upon a specific type of the hydraulic element 102 and/or the hydraulic accumulator 106 in the machine 100. The memory 136 may be configured to store other parameters including but not limited to a desired or preset value of the system efficiency for the system 101, the discharge pressure 304 and discharge rate for the hydraulic element 102 when the hydraulic element 102 was new, a theoretical value for such parameters under various operating conditions of the machine 100 and/or the system 101, a charging rate and discharging rate for the hydraulic accumulator 106, various thresholds for proper operation of the hydraulic load 108, etc.

Further, the memory 136 is configured to store fuel maps, lookup tables, variables, and the like associated with the machine 100 in general, and the system 101 in particular. In one aspect, the memory 136 may be an electrically erasable programmable read-only memory (EEPROM), although other memory types could be used (e.g., random access memory (RAM) units). In one aspect, the computer executable instructions 144 in the memory 136, when executed by the processor 134 cause the processor 134 to determine the health of the hydraulic element 102 and predict a remaining useful life of the hydraulic element 102, in accordance with the various aspects of the present disclosure.

The power source 138 may be a battery that may be configured to power various components of the ECM 104 including but not limited to the timer 124, the processor 134, and the memory 136. The timer 124 is a precise clocking and timing circuit configured to store timestamps associated with various events occurring in the machine 100 to the memory 136. In one aspect, the timer 124 may provide data associated with a charge time and a discharge time of the hydraulic accumulator 106 and charge time and a discharge time of the hydraulic element 102 to the processor 134, e.g., based upon sensor data received from the hydraulic accumulator pressure sensor 112, the hydraulic element pressure sensor 114, the hydraulic element speed sensor 116, and/or the hydraulic element temperature sensor 118.

The output device 120 may be configured, for example, to output or display a continuous estimate of the health and the remaining useful life of the hydraulic element 102 for identifying when the hydraulic element 102 may encounter a malfunction and/or a failure, and/or when the hydraulic element 102 needs replacement. The output may be visual, auditory, or a combination of both. Based on the data outputted by the processor 134 on the output device 120, a technician or an operator of the machine 100 may plan the logistics associated with the upkeep and replacement of the hydraulic element 102 as well as the system 101, in general. The output device 120 may generally be an electrical or electronic device configured to output real-time data related to the health and the remaining useful life of the hydraulic element 102 as and when signals, such as the pressure signal 156, the speed signal 158, and the temperature signal 160, from the hydraulic element pressure sensor 114, the hydraulic element speed sensor 116, and/or the hydraulic element temperature sensor 118, respectively, are received and processed by the processor 134 of the ECM 104. For example, the output device 120 may be a visual display unit inside an operator cab of the machine 100. Alternatively, the output device 120 may be provided at other locations on the machine 100. In one aspect, the output device 120 may be in a remote location away from the machine 100. The output device 120 may then display data wirelessly communicated from the ECM 104 via one or more antennas (not shown) on the machine 100 to a remote base station (not shown). Such a scenario may exist, for example, in hazardous environments where the machine 100 may be operated remotely in an unmanned mode. In one aspect, the output device 120 may be a liquid crystal display, although other types of displays may be used. In another aspect of this disclosure, the output device 120 may be a light emitting diode (LED) based indicator or an audio alarm indicator configured to indicate a health and remaining useful life of the hydraulic element 102, among other parameters. The output device 120 may, for example, communicate with the processor 134 and/or a graphics processor inside the ECM 104 to provide a display regarding various variables associated with the machine 100, in addition to the parameters of the hydraulic element 102 and/or the hydraulic accumulator 106. For example, as discussed, the output device 120 may provide visual indications of real time or instantaneous speed and temperature of the hydraulic element 102 and pressure drop of the hydraulic fluid 110 in the hydraulic accumulator 106 and/or the hydraulic element 102.

In one aspect of this disclosure, in addition to the various components and devices illustrated in FIG. 1, the system 101 may include other components such as additional sensors, processors, ECMs, memory units, communication devices, antennas, and the like. The system 101 may be part of the machine 100 and included within the machine 100. In an alternative aspect, one or more components of the system 101 may be outside or remote from the machine 100.

In one aspect of this disclosure, the hydraulic element speed sensor 116 may be a tachometer configured to measure an instantaneous speed of the hydraulic element 102, although other types of speed sensors could be used. The hydraulic element speed sensor 116 may be coupled to the ECM 104 to communicate speed information (e.g., in rotations per minute (rpm)) to the processor 134 via the I/O interface 142. Likewise, the hydraulic element temperature sensor 118 may be a thermometer device coupled to the ECM 104 to communicate temperature information (e.g., in ° C./° F.) to the processor 134 via the I/O interface 142. The hydraulic element pressure sensor 114 may be coupled to the ECM 104 to communicate pressure drop across the hydraulic element 102, or the discharge pressure 304 (shown in FIG. 3) of the hydraulic fluid 110 from the hydraulic element 102 (e.g., in kPa) to the processor 134 via the I/O interface 142. Likewise, the hydraulic accumulator pressure sensor 112 may be coupled to the ECM 104 to communicate pressure drop across the hydraulic accumulator 106 (e.g., in kPa) to the processor 134 via the I/O interface 142, while the machine 100 is in use. By way of example only, the hydraulic element pressure sensor 114 and the hydraulic accumulator pressure sensor 112 may each be an absolute pressure sensor or a gauge pressure sensor configured to obtain one or both of absolute as well as differential pressures. It will be appreciated that the positions and the couplings of the hydraulic element pressure sensor 114, the hydraulic element speed sensor 116, the hydraulic element temperature sensor 118, and the hydraulic accumulator pressure sensor 112 are shown by way of example only and not by way of limitation as other positions and connections may exist, relative to the various components of the system 101 and/or the machine 100. In addition to or optionally, the hydraulic element pressure sensor 114, the hydraulic element speed sensor 116, the hydraulic element temperature sensor 118, and the hydraulic accumulator pressure sensor 112 may communicate various measurements of the machine 100 as electrical, optical, or wireless signals to a remote base station (not shown) for analysis and control, e.g., via a GNSS system (not shown) coupled to the machine 100. Furthermore, the hydraulic element pressure sensor 114, the hydraulic element speed sensor 116, the hydraulic element temperature sensor 118, and the hydraulic accumulator pressure sensor 112 may be coupled to other parts or other hydraulic elements and hydraulic accumulators of the machine 100 to measure speed, temperature and pressure or pressure drop values corresponding to those parts.

INDUSTRIAL APPLICABILITY

Various aspects of the present disclosure are applicable generally to hydraulic elements. More particularly, various aspects of the present disclosure are applicable to the system 101 and a method 200 for estimating health and remaining useful life of the hydraulic element 102.

The flow rate of hydraulic elements has been measured as an indicator of health using expensive sensors or inaccurate flow measurement devices. However, these pure sensor based techniques to determine the flow rate may be prone to errors over time, e.g., from sensor drift, and may rely upon frequent replacement of sensors.

According to an aspect of this disclosure, an exemplary solution is to provide a better technique to estimate the health and the remaining useful life of the hydraulic element 102, which does not solely rely on sensors or flow meters only. The method 200 improves the conventional techniques by not purely relying on sensor output, but solving the complex problem of accurately estimating the health and remaining useful life of the hydraulic element 102 of the system 101 using the method 200, further to the sensor output.

Figure 2:
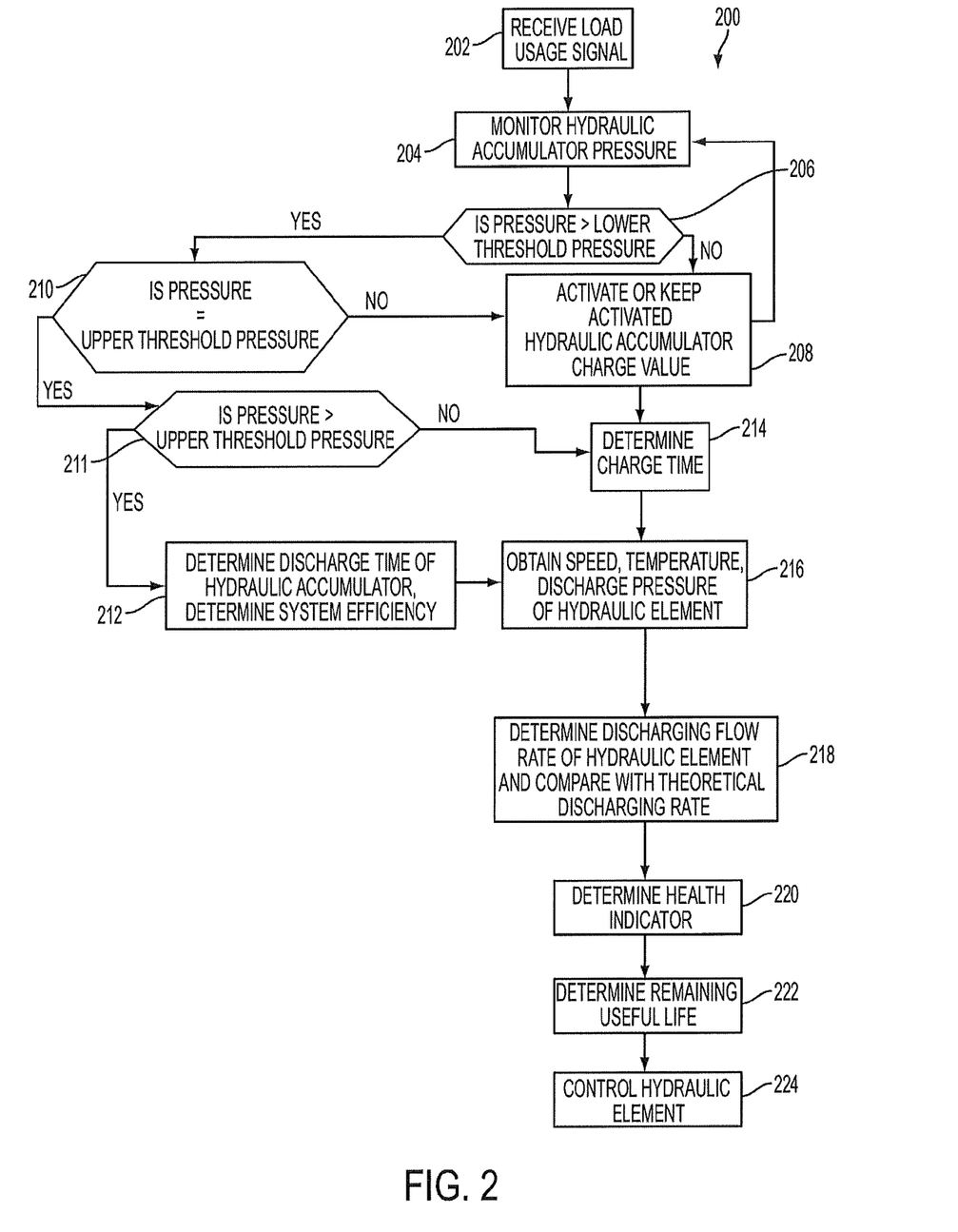
FIG. 2 illustrates a method for estimating health and remaining useful life of a hydraulic element using a flow diagram, in accordance with an aspect of this disclosure.

Referring to FIG. 2, the method 200 for estimating the remaining useful life (RUL) of the hydraulic element 102 is illustrated, in accordance with an aspect of this disclosure. FIG. 2 presents the method 200 as a flow diagram, although the method 200 may be understood using other types of presentations such as process diagrams, graphs, flowcharts, equations, etc. In one aspect, one or more processes or operations in the method 200 may be carried out by the ECM 104 inside the machine 100. For example, the one or more processes or operations may be carried out by the processor 134 inside the ECM 104, using data in the pressure signal 156, the speed signal 158, the temperature signal 160, the charging signal 150 and the discharging signal 152 received from the hydraulic element pressure sensor 114, the hydraulic element speed sensor 116, the hydraulic element temperature sensor 118, and/or the hydraulic accumulator pressure sensor 112, respectively. The pressure signal 156, the speed signal 158, the temperature signal 160, the charging signal 150 and/or the discharging signal 152 may be processed by the processor 134 and the computer executable instructions 144 stored in the memory 136 of the ECM 104 may be executed by the processor 134. As discussed, the data from the hydraulic element pressure sensor 114, the hydraulic element speed sensor 116, the hydraulic element temperature sensor 118, and/or the hydraulic accumulator pressure sensor 112 may be received at the ECM 104 and processed by the processor 134 while the machine 100 is in use. In another aspect, in the method 200, one or more processes or operations, or sub-processes thereof, may be skipped or combined as a single process or operation, and the flow of processes or operations in the method 200 may be in any order not limited by the specific order illustrated in FIG. 2. For example, one or more processes or operations may be moved around in terms of their respective orders, or may be carried out in parallel.

The method 200 may begin in an operation 202 in which the load usage signal 154 is received at the ECM 104. Specifically, the load usage signal 154 may be provided to the processor 134 via the I/O interface 142 of the ECM 104. The load usage signal 154 is sent by the hydraulic load 108 when the hydraulic load 108 is used by the machine 100. For example, when the hydraulic load 108 is a brake, the load usage signal 154 indicates to the processor 134 that the brakes of the machine 100 are being applied. In one aspect, the processor 134 may begin performing the method 200 only upon receiving the load usage signal 154. Alternatively, the processor 134 may carry out the method 200 at other times too, or at all times during the operation of the machine 100 and/or the system 101. When the hydraulic load 108 is used, a level of the hydraulic fluid 110 in the hydraulic accumulator 106 begins to fall as the hydraulic load 108, during usage, uses the hydraulic fluid 110. For example, the hydraulic fluid 110 may be a brake fluid used by the brakes of the machine 100. In this example, the hydraulic fluid 110 (or, brake fluid) has to be supplied to the hydraulic load 108 (e.g., brakes) at a preset constant pressure from the hydraulic accumulator 106 for proper operation of the hydraulic load 108. The preset constant pressure at which the hydraulic load 108 may operate may lie within a threshold range or a tolerance range stored in the memory 136.

Figure 3:
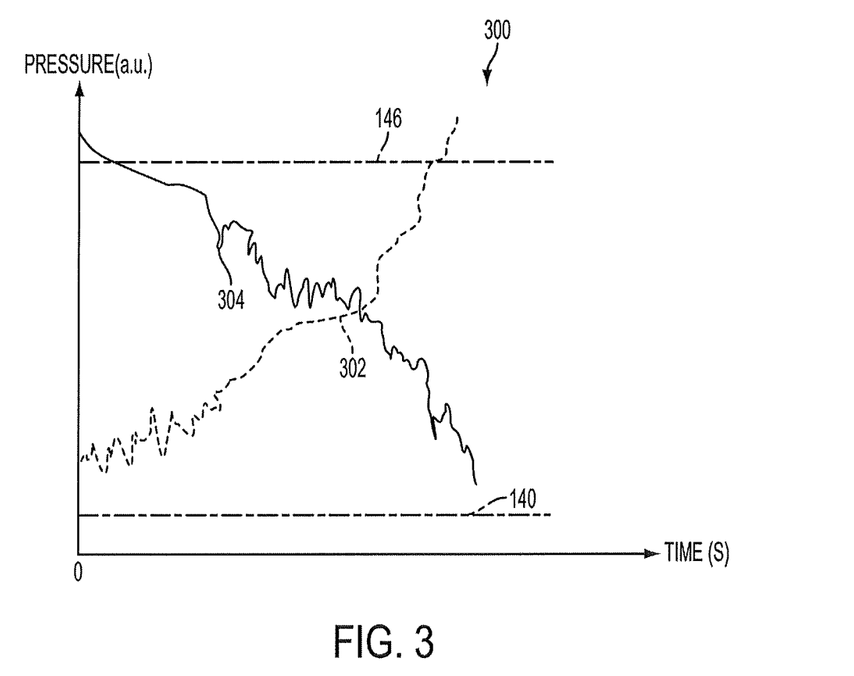
FIG. 3 illustrates variation in a current pressure of the hydraulic accumulator and a variation in a discharge pressure of the hydraulic element, in accordance with an aspect of this disclosure.

In an operation 204, the processor 134 may monitor a pressure drop across the hydraulic accumulator 106 and/or a pressure drop across the hydraulic element 102. The processor 134 may be configured to monitor the pressure drop across the hydraulic accumulator 106 based upon the charging signal 150 (when the hydraulic accumulator 106 is charging with the hydraulic fluid 110) and/or the discharging signal 152 (when the hydraulic accumulator 106 is discharging with the hydraulic fluid 110) from the hydraulic accumulator pressure sensor 112. Likewise, the pressure drop across the hydraulic element 102 may be determined by the processor 134 based upon the pressure signal 156 from the hydraulic element pressure sensor 114, when the hydraulic fluid 110 is being discharged out from the hydraulic element 102. The processor 134 may continuously monitor the pressure drops across the hydraulic accumulator 106 and/or the hydraulic element 102 in real-time as the machine 100 is in operation or use. In one aspect, the pressure drop across the hydraulic accumulator 106 may relate to a current pressure 302 of the hydraulic fluid 110 that is continuously monitored by the processor 134, as shown in FIG. 3. Likewise, the pressure drop across the hydraulic element 102 may be related to the discharge pressure 304 of the hydraulic fluid 110 from the hydraulic element 102, shown in FIG. 3. It will be appreciated that although the current pressure 302 and the discharge pressure 304 are illustrated as monotonically increasing curves with similar monotonicities lying between the upper threshold pressure 146 and the lower threshold pressure 140, such an illustration is by way of example only and not by way of limitation. For example, other types of linear, non-linear, monotonic, non-monotonic, continuous, and/or discontinuous shapes of the current pressure 302 and the discharge pressure 304 may exist. For example, the current pressure 302 and the discharge pressure 304 may be illustrated as curves having opposite slopes showing discharging of the hydraulic accumulator 106 and the hydraulic element 102, respectively. Further, the current pressure 302 and the discharge pressure 304 may lie within different thresholds, and may not have an intersection point, even though current pressure 302 and the discharge pressure 304 may be related. Furthermore, current pressure 302 and the discharge pressure 304 may have a shape depending upon the load usage signal 154. For example, if the hydraulic load 108 is applied intermittently, the current pressure 302 and the discharge pressure 304 may have intermittent or discontinuous shapes.

In an operation 206, the processor 134 may compare the current pressure 302 of the hydraulic accumulator 106 with the lower threshold pressure 140. If the current pressure 302 of the hydraulic accumulator 106 is not greater than the lower threshold pressure 140, in an operation 208, the processor 134 activates or keeps activated the hydraulic accumulator charge valve 103. As a result, the hydraulic accumulator 106 sends the charging signal 150 to the processor 134 indicating that the hydraulic accumulator 106 is being charged with the hydraulic fluid 110. As the hydraulic fluid 110 continues to fill the hydraulic accumulator 106, the current pressure 302 inside the hydraulic accumulator 106 continues to increase. At the same time, the discharge pressure 304 may continuously decrease as indicated by the pressure signal 156 from the hydraulic element pressure sensor 114 to the processor 134.

In an operation 210, the processor 134 compares the current pressure 302 with the upper threshold pressure 146. If the current pressure 302 of the hydraulic accumulator 106 is not equal to the upper threshold pressure 146, the processor 134 continues performing the operation 208 in which the hydraulic accumulator 106 continues charging by way of an open state of the hydraulic accumulator charge valve 103. However, if the processor 134 determines that the current pressure 302 is equal to the upper threshold pressure 146, an operation 211 is carried out by the processor 134.

Figure 6:
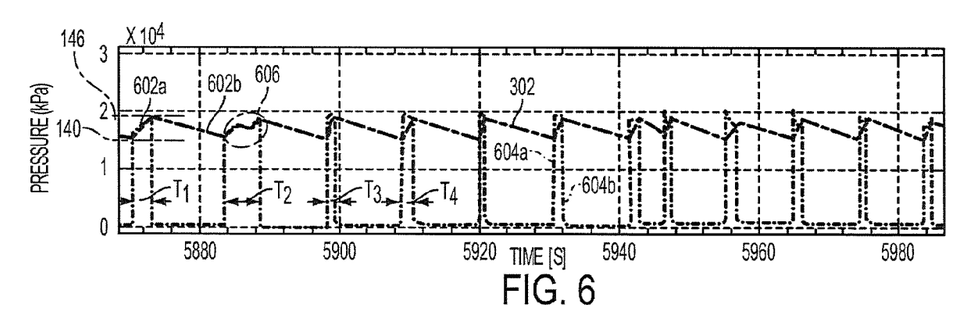
FIG. 6 illustrates the current pressure of the hydraulic accumulator and a hydraulic element output, in accordance with an aspect of this disclosure

In the operation 211, the processor 134 determines if the current pressure 302 is greater than the upper threshold pressure 146. If not, the processor 134 performs an operation 214. However, if the current pressure 302 is greater than the upper threshold pressure 146, the processor 134 carries out an operation 212. In one aspect of this disclosure, the processor 134 may carry out the operation 212 not only when the current pressure 302 is greater than the upper threshold pressure 146 but when the system 101 is in a discharge state (or, a discharging state) and the current pressure 302 is between the upper threshold pressure 146 and the lower threshold pressure 140. In this respect, the system 101 may have two states, one being a charge state (or, a charging state) and the other being the discharge state. The charging state of the system 101 may be related to when the hydraulic accumulator charge valve 103 is in an open state and the current pressure 302 in the hydraulic accumulator 106 is increasing (as illustrated in FIGS. 3 and 6, for example). The discharge state may be related to when the hydraulic accumulator charge valve 103 is closed and the current pressure 302 is decreasing (as illustrated in FIG. 6, for example).

Figure 4:
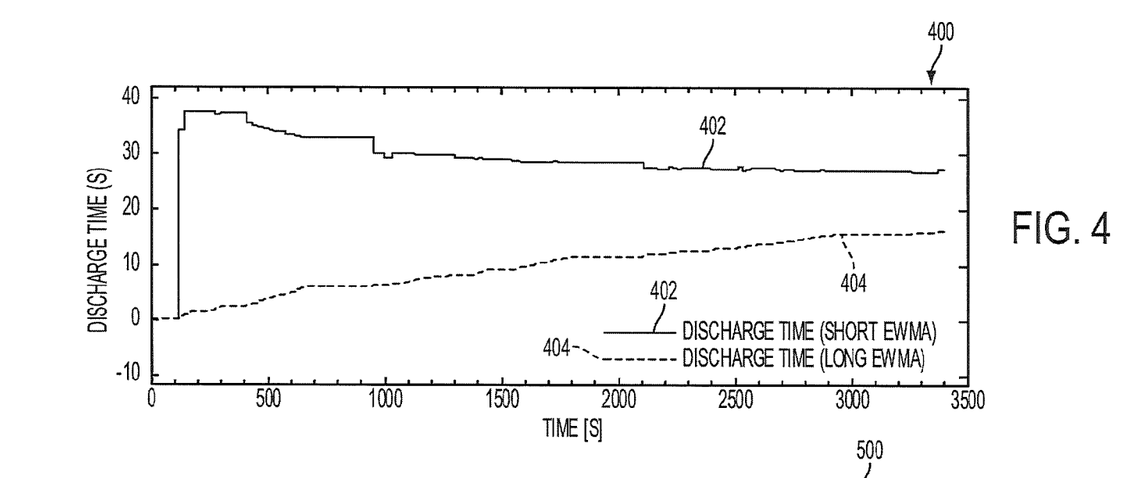
FIG. 4 illustrates plots for a discharge time of the hydraulic accumulator, in accordance with an aspect of this disclosure.

In the operation 212, the processor 134 may start discharging the hydraulic accumulator 106 using the discharging signal 152. Accordingly, the processor 134 may determine a discharge time of the hydraulic accumulator 106 during the discharging of the hydraulic accumulator 106. The hydraulic accumulator 106 may operate at a constant value of the current pressure 302 between the lower threshold pressure 140 and the upper threshold pressure 146 for proper operation of the hydraulic load 108. That is, the hydraulic fluid 110 may be provided at a constant pressure (e.g., the upper threshold pressure 146) to the hydraulic load 108 for proper operation of the hydraulic load 108. To maintain the current pressure 302 of the hydraulic accumulator 106 to equal the constant pressure value, the processor 134 may control the hydraulic accumulator 106 to discharge an amount of the hydraulic fluid 110 into the drain 122 to bring the current pressure 302 back to the constant pressure level (i.e., to be equal to the upper threshold pressure 146). The discharge time of the hydraulic accumulator 106 may be determined using one or more of discharge time plots 400 shown in FIG. 4. In FIG. 4, the discharge time plots 400 include a short exponentially weighted moving average (EWMA) discharge time plot 402 and a long EWMA discharge time plot 404. The short EWMA discharge time plot 402 may be used by the processor 134 for diagnostics on the system 101 to trigger events occurring over short time periods. These events could include a catastrophic failure of a component of the hydraulic load 108, such as a break in a hose or a malfunction in the brakes or brake valves, for example. Further, to detect such failures, an upper diagnostic threshold on the discharge rate of the hydraulic accumulator 106 could be provided to the processor 134 from the memory 136 that may indicate a system failure of the system 101. The long EWMA discharge time plot 404 is used by the processor 134 for condition monitoring to estimate degradation of the system efficiency of the system 101. The system efficiency of the system 101 may then be used by the processor 134 to determine an overall efficiency of the machine 100. By way of example only and not by way of limitation, the processor 134 may determine a relationship between the short EWMA ($\delta_{short}$) of the discharge time and the long EWMA ($\delta_{long}$) of the discharge time with respect to a failure threshold ($\delta_{threshold}$) stored in the memory 136. If $\delta_{short}-\delta_{long} \geq \delta_{threshold}$, the processor 134 may set a failure flag in the memory 136 to be equal to a '1', and if not, the failure flag may be set to a '0'. It will be appreciated that the values of the failure flag are in binary by way of example only and not by way of limitation, as other types of indicators to determine whether a potential system failure may be identified for the system 101 (e.g., when the system efficiency is below a certain value).

Based upon the discharge time of the hydraulic accumulator 106, the processor 134 determines a system efficiency of the system 101. Physically, the system 101 may have a leakage of the hydraulic fluid 110 associated with it during a normal course of operation of the machine 100. The leaked amounts of the hydraulic fluid 110 flow back into the drain 122, for example during a discharging of the hydraulic accumulator 106, or at other times. This leakage allows the hydraulic accumulator 106 to discharge over a period of time, the higher the leakage the faster the discharge rate of the hydraulic accumulator 106. If the hydraulic accumulator 106 is found to be discharging faster than a preset discharge rate stored in the memory 136, the system 101 may have a problematic symptom that may affect proper functioning of the system 101. Further, it will be appreciated that the processor 134 may determine the system efficiency of the system 101 not only when the hydraulic accumulator 106 is discharging. Rather, the processor 134 may determine the system efficiency at other times including but not limited to when the hydraulic accumulator 106 is charging (e.g., in the operation 214). Some of the hydraulic fluid 110 may leak into the drain 122 and the processor 134 may determine the system efficiency by how fast such leakage happens at the hydraulic accumulator 106 or how much of the hydraulic fluid 110 leaks out of the hydraulic accumulator 106. In one aspect, the processor 134 may send the control signal 162 to the hydraulic accumulator charge valve 103 to open or close the hydraulic accumulator charge valve 103 when the system efficiency falls below a threshold system efficiency value stored in the memory 136.

In one aspect of this disclosure, the system efficiency of the system 101 may be determined by the processor 134 using an equation (1):

$$\gamma_{sys} = \frac{\delta_{long}}{\delta_{new}} * 100 \qquad (1)$$

where $\delta_{new}$ is a calibrated discharge rate of the hydraulic accumulator 106 with a new or fully functioning system 101 and $\gamma_{sys}$ is the system efficiency estimated using the long EWMA ($\delta_{long}$) of the discharge time.

Figure 5:
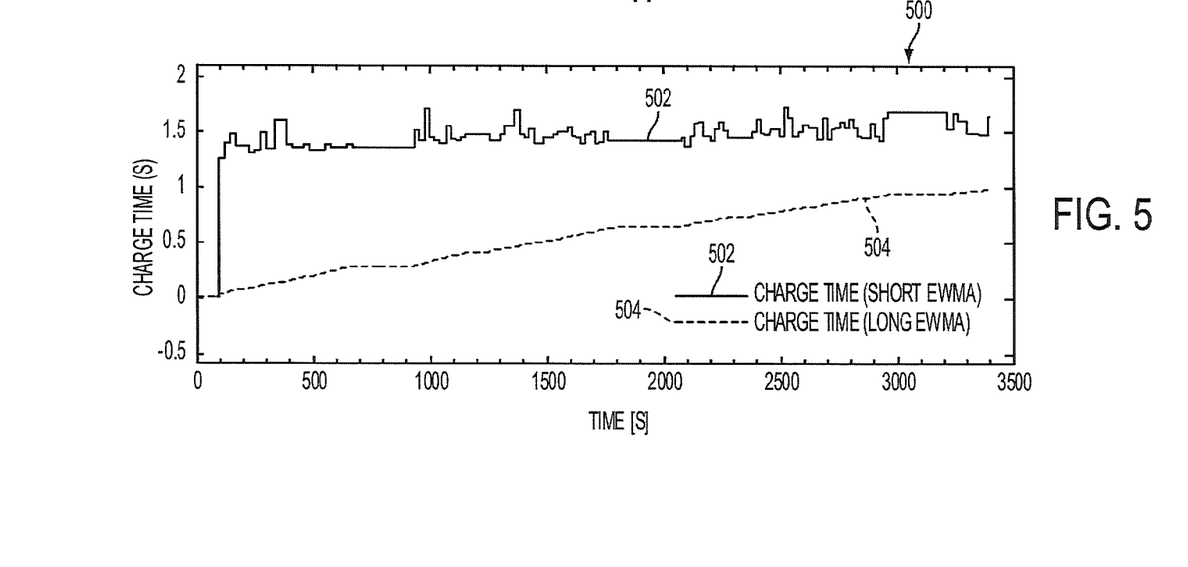
FIG. 5 illustrates plots for a charge time of the hydraulic accumulator, in accordance with an aspect of this disclosure.

In the operation 214, when the current pressure 302 of the hydraulic fluid 110 in the hydraulic accumulator 106 is below the upper threshold pressure 146, the processor 134 may charge the hydraulic accumulator 106. In one aspect, the processor 134 may wait until the current pressure 302 falls below the lower threshold pressure 140 before opening the hydraulic accumulator charge valve 103, and then determine a charge time of the hydraulic accumulator 106. The processor 134 may determine the charge time of the hydraulic accumulator 106 using one or more of charge time plots 500. The charge time may be determined using a short EWMA charge time plot 502 and/or a long EWMA charge time plot 504. The short EWMA charge time plot 502 indicate that the processor 134 only calculates a new charge or discharge time after a qualifying charging or discharging event has occurred. The processor 134 may not continuously calculate the charge/discharge times of the hydraulic accumulator 106, and may do so only after a charging or discharging event has occurred. The processor 134 may hold the previous charge/discharge time in the memory 136, along with a timestamp of when the triggering event occurred until another event has occurred. The processor 134 may then update the short EWMA charge time plot 502. Based upon the charge time of the hydraulic accumulator 106, the processor 134 determines a discharging flow rate of the hydraulic element 102. When the hydraulic accumulator 106 goes into a charging cycle, the charging rate is indicative of the flow of the hydraulic fluid 110 out from the hydraulic element 102. The longer the charge time of the hydraulic accumulator 106, the lower is the discharging flow rate of the hydraulic element 102. Accordingly, the lower the discharging flow rate of the hydraulic element 102 (as determined from the charging time of the hydraulic accumulator 106), the poorer is a health of the hydraulic element 102, and the lower is the remaining useful life of the hydraulic element 102.

Figure 7:
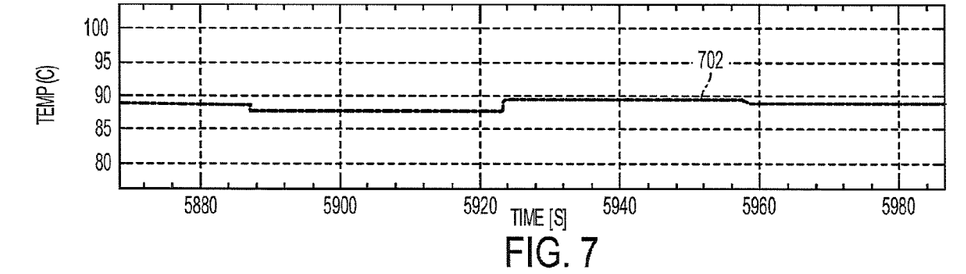
FIG. 7 illustrates a temperature variation in the hydraulic element of the machine of FIG. 1, in accordance with an aspect of this disclosure.
Figure 8:
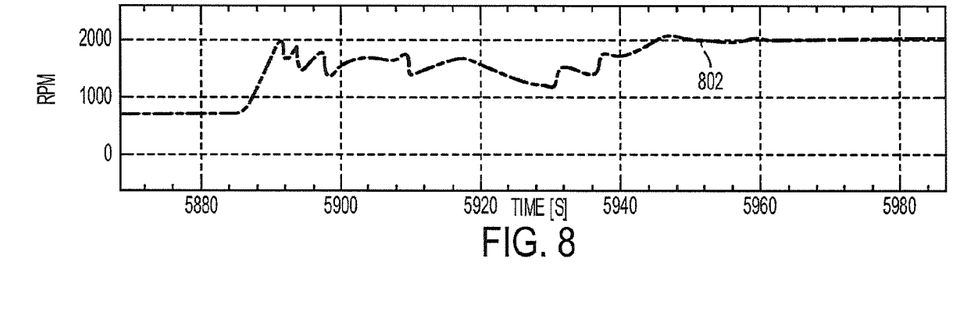
FIG. 8 illustrates a speed variation in a hydraulic element of the machine of FIG. 1, in accordance with an aspect of this disclosure.

In an operation 216, the processor 134 may obtain a speed 802, (illustrated in FIG. 8) of the hydraulic element 102 during a discharging of the hydraulic element 102 from the hydraulic element speed sensor 116, a temperature 702 (illustrated in FIG. 7) of the hydraulic element 102 during a discharging of the hydraulic element 102 from the hydraulic element temperature sensor 118, and/or the discharge pressure 304 of the hydraulic element 102 from the hydraulic element pressure sensor 114. The processor 134 may further use the pressure signal 156 to determine how fast the discharge pressure 304 is changing (or, the discharging flow rate of the hydraulic element 102), in addition to the charging signal 150 obtained from the hydraulic accumulator pressure sensor 112. The speed 802 of the hydraulic element 102 may be provided to the processor 134 by the speed signal 158, the temperature 702 may be provided to the processor 134 by the temperature signal 160, and the discharge pressure 304 of the hydraulic element 102 may be provided by the pressure signal 156, as illustrated in FIG. 1, for example. The speed 802, the temperature 702 and the discharge pressure 304 of the hydraulic element 102 during a discharging may be used by the processor 134 to determine a current operating state of the hydraulic element 102, as discussed further with respect to FIG. 6. The current operating state the hydraulic element 102 may further be used by the processor 134 to determine a current operating state of the system 101 in general. The current operating state of the hydraulic element 102 and/or the system 101 may be defined by temperature thresholds, pressure thresholds and engine speed thresholds stored in the memory 136. For example, the processor 134 may carry out the method 200 when the current operating state reaches or is set to a specific value of variables for the machine 100, e.g., when engine speed of the machine 100 is greater than or equal to 800 rpm, oil temperature is greater than or equal to 40° C. and the discharge pressure 304 is greater than 500 kPa Referring to FIG. 6, a plot 600 including the current pressure 302 of the hydraulic accumulator 106 and a hydraulic element output 604 of the hydraulic fluid 110 is illustrated as a continuous time series, in accordance with an aspect of this disclosure. The current pressure 302 further includes a charging portion 602a and a discharging portion 602b for the hydraulic accumulator 106. The plot 600 illustrates that as the hydraulic element output 604 overlaps with the current pressure 302 during an overlap portion 606. When the current pressure 302 reaches the lower threshold pressure 140, the hydraulic element 102 provides hydraulic fluid 110 to the hydraulic accumulator 106 as indicated by a rising portion 604a of the hydraulic element output 604. The hydraulic accumulator 106 then charges with the hydraulic fluid 110, as illustrated by the charging portion 602a, following the hydraulic element output 604, until the current pressure 302 reaches the upper threshold pressure 146. During this time, the hydraulic accumulator 106 continuously sends the charging signal 150 to the processor 134. When the current pressure 302 reaches the upper threshold pressure 146, the hydraulic element output 604 starts falling back to a zero level and no more of the hydraulic fluid 110 is supplied to the hydraulic accumulator 106, as indicated by a falling portion 604b of the hydraulic element output 604. The current pressure 302 then starts falling again, as indicated by the discharging portion 602b and the discharging signal 152 is sent to the processor 134.

In one aspect of this disclosure, the current pressure 302 may fall in the discharging portion 602b due to a leakage of the hydraulic fluid 110 from the hydraulic accumulator 106 to the drain 122. If the discharging portion 602b has a slope more negative than a predetermined slope value stored in the memory 136, the processor 134 may determine that the system efficiency of the system 101 has been negatively affected since the hydraulic accumulator 106 is discharging at a faster rate than expected. Alternatively, if the slope of the discharging portion 602b is within the predetermined slope value, the processor 134 determines the system 101 to be operating at an acceptable value of the system efficiency. It will be appreciated that the hydraulic accumulator 106 may drain off excessive amounts of the hydraulic fluid 110 to the drain 122 for other reasons too without any effect on the system efficiency.

The charging portion 602a and the discharging portion 602b repeat in the plot 600 in synchronism with the rising portion 604a and the falling portion 604b, respectively, of the hydraulic element output 604 such that the hydraulic accumulator pressure sensor 112 always measures the pressure drop across the hydraulic accumulator 106 to be within a range defined by the lower threshold pressure 140 and the upper threshold pressure 146. The hydraulic accumulator charge valve 103 may accordingly open and close to charge and discharge the hydraulic accumulator 106, respectively. Further, the hydraulic load 108 may be accordingly configured to operate within this range defined by the lower threshold pressure 140 and the upper threshold pressure 146.

As illustrated in FIG. 6, the hydraulic element output 604 has pulses of varying widths indicated by time intervals $T_1$, $T_2$, $T_3$, $T_4$, etc. The time intervals $T_1$, $T_2$, $T_3$, $T_4$, etc., may be determined by the processor 134 based upon how long the charging signal 150 and the discharging signal 152 are received from the hydraulic accumulator 106. The values of the time intervals $T_1$, $T_2$, $T_3$, $T_4$, etc., may be compared with threshold time interval values stored in the memory 136 to determine whether the hydraulic accumulator 106 is charging and discharging at an appropriate value of the charging rate and the discharging rate, respectively. The processor 134 may then correlate the charging rate of the hydraulic accumulator 106 with the discharging flow rate of the hydraulic element 102 (e.g., discussed with respect to an operation 218) to determine a health indicator of the health of the hydraulic element 102 (e.g., discussed with respect to an operation 220) and the remaining useful life of the hydraulic element 102 (e.g., discussed with respect to an operation 222).

Further, the discharging portion 602b may be used by the processor 134 to determine how much and at what rate of the hydraulic fluid 110 is leaking into the drain 122, or at what rate the hydraulic fluid 110 is being used by the hydraulic load 108. As a result, a discharge rate of the hydraulic accumulator 106 (e.g., determined in the operation 212), is an indicator of the system efficiency of the system 101. For example, a time gap between the time intervals $T_1$, $T_2$, $T_3$, $T_4$, etc., of the hydraulic element output 604 (corresponding to a time in which the hydraulic accumulator 106 discharges) may be compared with a predetermined time gap stored in the memory 136 by the processor 134 to determine the system efficiency of the system 101.

In the operation 218, the processor 134 may determine the discharging flow rate of the hydraulic element 102 based upon the widths of the time intervals $T_1$, $T_2$, $T_3$, $T_4$, etc. Since the widths of the time intervals $T_1$, $T_2$, $T_3$, $T_4$, etc., are within the charging portion 602a for the hydraulic accumulator 106, a discharging flow rate of the hydraulic element 102 may be determined by the processor 134. The processor 134 may compare the discharging flow rate of the hydraulic accumulator 106 with a theoretical value of the discharging flow rate for the hydraulic element 102. For example, the processor 134 may obtain the discharging flow rate for a time when the hydraulic element 102 was new for comparison with the current discharging flow rate determined from the plot 600 and/or the plot 300. The discharging flow rate when the hydraulic element 102 was new may be obtained by the processor 134 from the memory 136. Alternatively, the discharging flow rate of the hydraulic element 102 may be compared with the theoretical discharging flow rate at a given speed and temperature, as determined from the speed signal 158, and the temperature signal 160, as the machine 100 is being used.

In the operation 220, the processor 134 may determine a health indicator for the hydraulic element 102 based on a difference between the discharging flow rate of the hydraulic element 102 measured in the operations 216 and 218 and the discharging flow rate for a new hydraulic element 102. The health indicator for the hydraulic element 102 may include a current health state or a wear estimate for the hydraulic element 102. The wear estimate for the hydraulic element 102 may be expressed as a percentage, for example. In one aspect, the health indicator may be determined using a recursive least squares (RLS) algorithm executed by the processor 134 using the computer executable instructions 144, although other types of algorithms including but not limited to a Least Mean Squares Filter, Kalman Filter, Particle Filter, Weiner Filter, etc., could be used. For example, the recursive least squares algorithm may be executed by the processor 134 by executing the computer executable instructions 144 stored in the memory 136 starting with an initial discharging flow rate value for the hydraulic accumulator 106, also stored in the memory 136. Such initial discharging flow rate may be for a time when the hydraulic element 102 was new, or for a time when the hydraulic element 102 was last used in a previous operation of the machine 100. By way of example only and not by way of limitation, the processor 134 may determine the health indicator of the hydraulic element 102 using an equation (2):

$$\gamma_{element} = \frac{\beta_{long}}{\beta_{new}} * 100 \qquad (2)$$

where $\beta_{long}$ is the long EWMA charge time of the hydraulic accumulator 106 calculated by the processor 134 in the operation 214, $\beta_{new}$ is a calibrated charge time of the hydraulic accumulator 106 with a new or fully functioning hydraulic element 102, and $\gamma_{element}$ is an estimated element efficiency used as the health indicator of the hydraulic element 102 for long term trending (as indicated by the long EWMA charge time plot 504. The current health state or the wear estimate of the hydraulic element 102 may then be determined by the processor 134 by binning the value of $\gamma_{element}$ into various threshold ranges. Such binning of $\gamma_{element}$ into the various threshold ranges may determine the wear estimate as a percentage (%) value. For example, the wear estimate may indicate, using equation (2), that the hydraulic element 102 is 50% worn out, 75% worn out, etc., although the wear estimate may be expressed using other parameters including but not limited to normalized values (between 0 and 1), and the like.

In the operation 222, the processor 134 may determine a remaining useful life (RUL) of the hydraulic element 102. The processor 134 may determine the RUL from a total number of hours the hydraulic element 102 has been used. Such determination of the total number of hours the hydraulic element 102 has been used may be obtained from a total operating hours of the machine 100, e.g., stored in the memory 136, and subtracting a time instance when the hydraulic element 102 was replaced (also stored in the memory 136). The processor 134 may then determine the RUL of the hydraulic element 102 taking into account the total number of hours the hydraulic element 102 has been used and the health indicator of the hydraulic element 102 determined in the operation 220 (or, the current health state of the hydraulic element 102). By way of example only, the RUL of the hydraulic element 102 may be expressed in units of time, although other expressions for the RUL of the hydraulic element 102 such as remaining number of operating cycles, and the like, could be used. In one aspect, the processor 134 may obtain a current time of operation of the hydraulic element 102 from the timer 124. The processor 134 may then utilize the current time to calculate a time difference from when the hydraulic element 102 was newly installed. The time difference may be factored into the determination of the RUL of the hydraulic element 102.

In one aspect of the disclosure, the RUL may be obtained by the processor 134 by executing an RLS algorithm stored in the memory 136 and performed on the long EWMA charge time plot 504. The processor 134 may then determine the wear estimate of the hydraulic element 102, as indicated in the equation (2). Subsequently, the processor 134 may obtain a time for which the hydraulic element 102 has been used from the timer 124 to determine the RUL of the hydraulic element 102, as well as total operating hours of the machine 100. Alternatively or additionally, the RUL may be determined by the processor 134 in terms of health indicator (e.g., expressed as a percent health value), using an equation (3):

$$RUL = 100 - \gamma_{element} \qquad (3)$$

In an operation 224, the processor 134 may control the hydraulic element 102 based upon the RUL of the hydraulic element 102, and/or based on the health indicator of the hydraulic element 102. For example, the processor 134 may output one or more of the plurality of control signals 164 to the hydraulic element 102 based upon the determination of the RUL in the operation 224. The plurality of control signals 164 may result in various operations on the hydraulic element 102, depending upon the determination of the RUL and/or the health indicator of the hydraulic element 102. By way of example only and not by way of limitation, the processor 134 may determine that the RUL of the hydraulic element 102 is not sufficient to ensure proper operation of the hydraulic element 102, the system 101, and/or the machine 100. In this example, the processor 134 may control the hydraulic element 102 by shutting off the hydraulic element 102 using one or more of the plurality of control signals 164. The processor 134 may then use a different hydraulic element (not shown). In another example, the processor 134 may output an alarm signal (e.g., an audio or an optical signal) to the output device 120 indicating a poor health of the hydraulic element 102. Simultaneously and/or independently, the processor 134 may output the determined RUL and/or the health indicator for the hydraulic element 102 for an operator to plan a shutdown of the machine 100. The processor 134 may further control the hydraulic element 102 based upon the determined RUL and/or the health indicator by limiting a usage of the hydraulic element 102. For example, when the processor 134 determines that the RUL of the hydraulic element 102 is below a preset value, the processor 134 may send one of the plurality of control signals 164 to activate the hydraulic element 102 only when required and not at all times during the operation of the machine 100. Furthermore, the processor 134 may control the hydraulic element 102 based on the determined RUL using the plurality of control signals 164 by initiating a cleaning system (not shown) to clean the hydraulic element 102, a diagnostic system (not shown) to diagnose reasons behind a low discharging flow rate of the hydraulic element 102, or other physical components of the machine 100 coupled to the hydraulic element 102 to prevent a failure of the hydraulic element 102 and/or to extend the RUL of the hydraulic element 102. Likewise, the processor 134 may control the hydraulic element 102 using a bypass element to prevent the hydraulic fluid 110 from entering the hydraulic element 102, or to run diagnostic tests on the hydraulic element 102.

In one aspect, the processor 134 may put the system 101 in a diagnostic mode to identify one or more reasons behind an unacceptable value of the system efficiency of the system

101. In another aspect, the processor 134 may send continuous output signals to the output device 120, for example, to display in real time, the system efficiency of the system 101, the health and the RUL of the hydraulic element 102, various plots illustrated in FIGS. 3-8, and the like. In yet another aspect, the processor 134 may identify any false alarms based on the system efficiency of the system 101, the health and the RUL of the hydraulic element 102, either in measurements of the system efficiency of the system 101 and the health and the RUL of the hydraulic element 102, or for other parameters associated with the machine 100.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Additionally, the various aspects of the disclosure with respect to the system 101 may be implemented in a non-generic computer implementation. Moreover, the various aspects of the disclosure set forth herein improve the functioning of the system 101 as is apparent from the disclosure hereof. Furthermore, the various aspects of the disclosure involve computer hardware that is specifically programmed to solve the complex problem addressed by the disclosure. Accordingly, the various aspects of the disclosure improve the functioning of the system 101 overall in its specific implementation to perform the process set forth by the disclosure and as defined by the claims.

I claim:

1. A method for estimating health and remaining useful life of a hydraulic element of a machine, the method comprising:
   determining, at a processor of the machine, a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator;
   determining, at the processor, a discharging flow rate of the hydraulic element based upon the determined charge time of the hydraulic accumulator;
   determining, at the processor, a health indicator of the hydraulic element based upon a difference between the determined discharging flow rate of the hydraulic element and a stored discharging flow rate of the hydraulic element when new;
   determining, at the processor, a remaining useful life of the hydraulic element based upon the health indicator of the hydraulic element; and
   controlling, at the processor, the hydraulic element based upon the remaining useful life of the hydraulic element.

2. The method of claim 1, wherein said determining the charge time of the hydraulic accumulator is carried out upon receiving a load usage signal from a hydraulic load of the machine.

3. The method of claim 1, wherein the processor is configured to determine the charge time of the hydraulic accumulator by:
   continuously monitoring the current pressure of the hydraulic fluid in the hydraulic accumulator during a charging of the hydraulic accumulator,
   comparing the monitored current pressure with the upper threshold pressure, and
   determining the charge time based upon a timer when the current pressure is equal to the upper threshold pressure.

4. The method of claim 3, wherein said charging of the hydraulic accumulator is carried out when the monitored current pressure is between a lower threshold pressure and the upper threshold pressure.

5. The method of claim 1 further comprising:
   determining, at the processor, a discharge time of the hydraulic accumulator in which the current pressure of the hydraulic fluid reaches a lower threshold pressure of the hydraulic fluid.

6. The method of claim 5 further comprising:
   determining, at the processor, a system efficiency of the machine based on the discharge time of the hydraulic accumulator.

7. The method of claim 5, wherein the processor is further configured to determine the discharge time of the hydraulic accumulator by:
   continuously monitoring the current pressure of the hydraulic fluid during a discharging of the hydraulic accumulator,
   comparing the monitored current pressure with the lower threshold pressure, and
   determining the discharge time based upon a timer when the monitored current pressure is equal to the lower threshold pressure.

8. The method of claim 1, wherein the processor is configured to determine the remaining useful life of the hydraulic element further based on:
   a speed of the hydraulic element, during a discharging of the hydraulic element, based upon a speed signal received from a hydraulic element speed sensor coupled to the processor and the hydraulic element, and
   a temperature of the hydraulic element, during a discharging of the hydraulic element, based upon a temperature signal received from a hydraulic element temperature sensor coupled to the processor and the hydraulic element.

9. The method of claim 1, wherein said determining the health indicator includes determining a wear estimate of the hydraulic element.

10. A system for estimating health and remaining useful life of a hydraulic element, the system comprising:
    an electronic control module coupled to an output device, the electronic control module including a processor, the processor coupled to the hydraulic element and configured to:
    determine a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator;

determine a discharging flow rate of the hydraulic element based upon the determined charge time of the hydraulic accumulator;

determine a health indicator of the hydraulic element based upon a difference between the determined discharging flow rate of the hydraulic element and a stored discharging flow rate of the hydraulic element when new;

determine a remaining useful life of the hydraulic element based upon the health indicator of the hydraulic element; and control the hydraulic element based upon the remaining useful life of the hydraulic element.

11. The system of claim 10, wherein the processor is configured to determine the charge time of the hydraulic accumulator upon receiving a load usage signal from a hydraulic load.

12. The system of claim 10, wherein the processor is configured to determine the charge time of the hydraulic accumulator by:

continuously monitoring the current pressure of the hydraulic fluid in the hydraulic accumulator during a charging of the hydraulic accumulator, comparing the monitored current pressure with the upper threshold pressure, and determining the charge time based upon a timer when the current pressure is equal to the upper threshold pressure.

13. The system of claim 12, wherein the hydraulic accumulator is charged by opening a hydraulic accumulator charge valve coupled to the hydraulic accumulator when the monitored current pressure is between a lower threshold pressure and the upper threshold pressure.

14. The system of claim 10, wherein the processor is further configured to:

determine a discharge time of the hydraulic accumulator in which the current pressure of the hydraulic fluid reaches a lower threshold pressure of the hydraulic fluid.

15. The system of claim 14, wherein the processor is further configured to:

determine a system efficiency of the system based on the determined discharge time.

16. The system of claim 10, wherein the processor is configured to determine the remaining useful life of the hydraulic element further based on:

a speed of the hydraulic element, during a discharging of the hydraulic element, based upon a speed signal received from a hydraulic element speed sensor coupled to the processor and the hydraulic element, and a temperature of the hydraulic element, during a discharging of the hydraulic element, based upon a temperature signal received from a hydraulic element temperature sensor coupled to the processor and the hydraulic element.

17. The system of claim 10, wherein the hydraulic element is a charge pump coupled to the hydraulic accumulator via a hydraulic accumulator charge valve and coupled to the electronic control module.

18. The system of claim 10, wherein the processor is configured to determine the health indicator based on a wear estimate of the hydraulic element.

19. A machine comprising the system of claim 10.

20. A non-transitory computer readable medium storing computer executable instructions thereupon for estimating health and remaining useful life of a hydraulic element, the computer executable instructions when executed by a processor of an electronic control module of a machine cause the processor to:

determine a charge time of a hydraulic accumulator coupled to the hydraulic element in which a current pressure of a hydraulic fluid in the hydraulic accumulator reaches an upper threshold pressure, the current pressure being measured by a hydraulic accumulator pressure sensor coupled to the processor and the hydraulic accumulator;

determine a discharging flow rate of the hydraulic element based upon the determined charge time of the hydraulic accumulator;

determine a health indicator of the hydraulic element based upon a difference between the determined discharging flow rate of the hydraulic element and a stored discharging flow rate of the hydraulic element when new;

determine a remaining useful life of the hydraulic element based upon the health indicator of the hydraulic element; and control the hydraulic element based upon the remaining useful life of the hydraulic element.

* * * * *